United States Patent [19]

Petitt, Jr.

[11] Patent Number: 4,646,589
[45] Date of Patent: Mar. 3, 1987

[54] CHAIN SAW SHARPENER AID

[76] Inventor: George E. Petitt, Jr., Rte. 3, Pickens, S.C. 29671

[21] Appl. No.: 343,152

[22] Filed: Jan. 27, 1982

[51] Int. Cl.⁴ .............................................. B23D 63/08
[52] U.S. Cl. ...................................... 76/36; 33/202; 33/DIG. 1; 269/1
[58] Field of Search ............ 269/1, 8; 33/202, 185 R, 33/DIG. 1; 211/69.1; 298/512, 513, 206 A, 537; 51/221 BS, 221 R; 76/36, 25 A

[56] References Cited

U.S. PATENT DOCUMENTS

| | | | |
|---|---|---|---|
| 1,778,481 | 10/1930 | Boucher | 33/DIG. 1 |
| 2,260,787 | 10/1941 | Nichols et al. | 248/513 |
| 2,669,405 | 2/1954 | Donnelly | 248/513 |
| 3,531,870 | 10/1970 | Romancky | 33/185 R |
| 3,905,118 | 9/1975 | Ballew | 33/202 |
| 3,955,786 | 5/1976 | Duddy | 248/537 |
| 4,185,382 | 1/1980 | Rawlinson | 33/185 R |

FOREIGN PATENT DOCUMENTS 326090 12/1957 Switzerland ...................... 248/512

Primary Examiner—Robert C. Watson
Attorney, Agent, or Firm—Julian W. Dority

[57] ABSTRACT

A guide for aiding in sharpening a chain saw with a file which includes a magnet having an elongated rod extending outwardly therefrom at an angle corresponding to the desired angle that is to be sharpened on the cutting edge of a tooth of a chain saw. The magnet is attached to a guide bar of the chain saw. When sharpening the teeth, the chain is moved around the saw and a file is moved across the leading edge of the tooth at an angle corresponding to the angle of the rod.

5 Claims, 5 Drawing Figures

U.S. Patent  Mar. 3, 1987  4,646,589
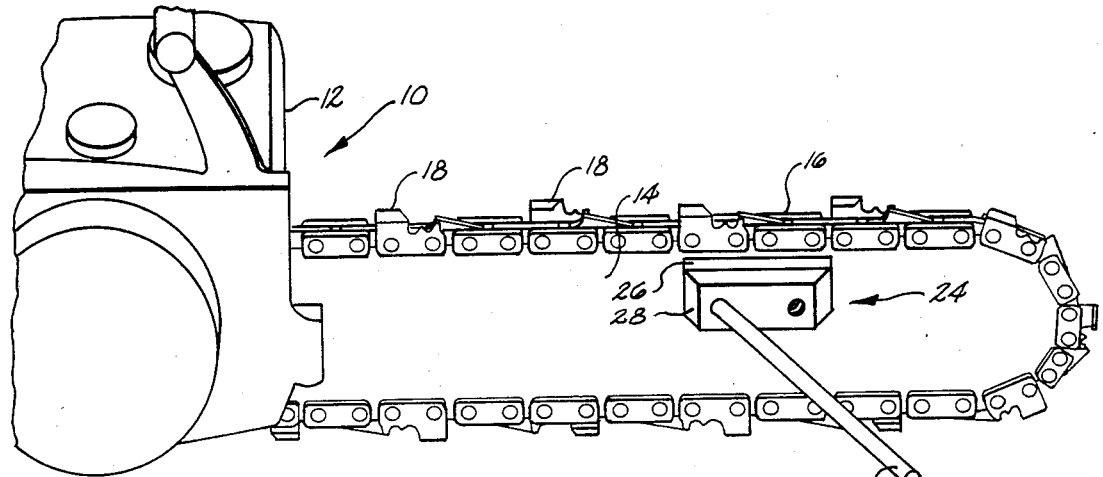
Fig. 1
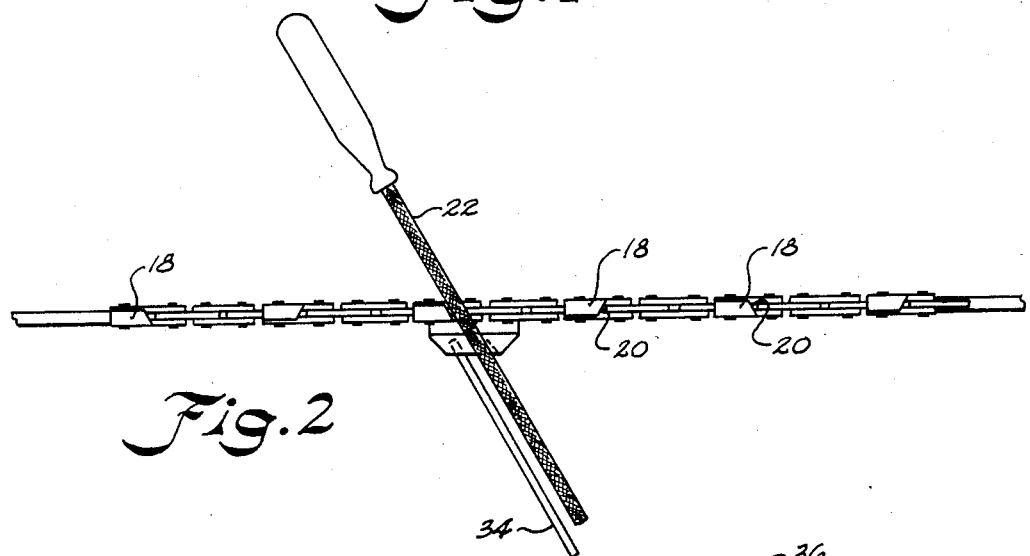
Fig. 2
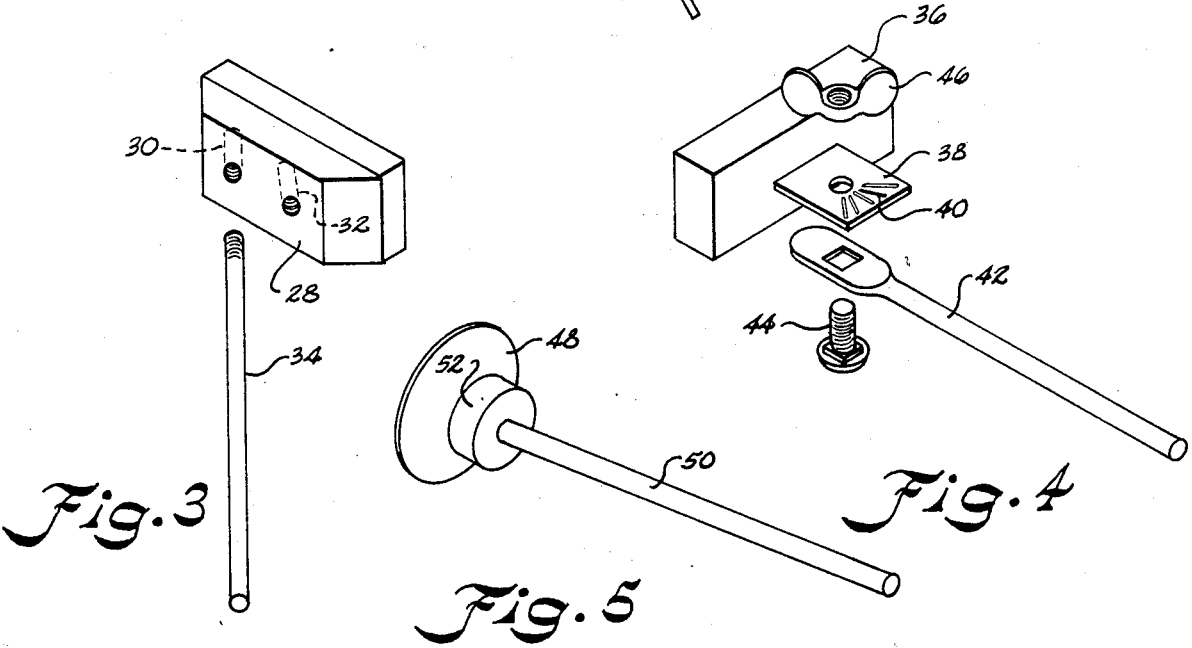
Fig. 3
Fig. 4
Fig. 5

CHAIN SAW SHARPENER AID

BACKGROUND OF THE INVENTION

When sharpening the teeth on the chain of a chain saw, it is necessary that the teeth be sharpened at a precise angle. For example, when sharpening the teeth for cutting oak, the angle of the tooth should be approximately 35 degrees. If the chain saw is to be used for cutting pine, then it may be desired to have the cutting edge of the teeth at a different angle. When these teeth are being sharpened by hand, it is difficult to stroke the front edge of the tooth with a file at precisely the same angle each time without some guide means.

There have been many attempts to provide guides for sharpening the teeth of a chain saw; however, they are normally complicated attachments that are relatively expensive and require a certain amount of time to install for use. Examples of some such sharpening devices are disclosed in U.S. Pat. Nos. 3,744,349; 4,062,253; 2,859,642; 3,670,600; 3,465,795; and 2,729,987.

SUMMARY OF THE INVENTION

The apparatus constructed in accordance with the present invention is provided for aiding in sharpening the teeth carried on a chain of a chain saw with a file. The chain saw has a conventional elongated metal guide bar upon which the chain runs during operation. In one particular embodiment, the guide includes a magnet which has a flat surface so that it can be magnetically attached to a side wall of the metal guide bar of the chain saw.

An elongated rod is carried by the magnet and extends horizontally from the magnet away the wall of the guide bar. The rod extends away from the guide bar at an angle corresponding to the desired angle that the teeth are to be sharpened.

During the sharpening operation, an elongated file is moved back and forth across the face of the tooth directly above and in alignment with the rod extending out of the magnet. As long as the file is maintained in alignment with the rod, the tooth will be filed to the desired angle.

Accordingly, it is an important object of the present invention to provide a relatively simple and inexpensive guide for aiding in sharpening the teeth of a chain saw.

Still another important object of the present invention is to provide a guide which can be used by relatively inexperienced people in sharpening the teeth of a chain used on a chain saw.

BRIEF DESCRIPTION OF THE DRAWINGS

The construction designed to carry out the invention will be hereinafter described, together with other features thereof.

The invention will be more readily understood from a reading of the following specification and by references to the accompanying drawing forming a part thereof, wherein an example of the invention is shown and wherein:

FIG. 1 is a side perspective view showing a conventional chain saw having a guide constructed in accordance with the present invention mounted thereon.

FIG. 2 is a plan view of a portion of the chain saw of FIG. 1.

FIG. 3 is an enlarged exploded view showing the guide constructed in accordance with the present invention.

FIG. 4 is a perspective view showing a guide in a modified form, and

FIG. 5 is a perspective view of still another modified form of the invention.

DESCRIPTION OF A PREFERRED EMBODIMENT

In FIG. 1, there is illustrated a conventional chain saw designated by the reference character 10 have an engine 12 with a chain guide bar 14 extending outwardly therefrom. Normally the chain guide bar is constructed of metal and has flat side walls with a groove provided in the edges thereof in which a chain 16 runs during the cutting operation. The chain 16 includes teeth 18 which alternately face to opposite sides of the guide bar. There is a front cutting edge 20 provided on each of the teeth, and as can be seen in FIG. 2, the cutting edge is at an angle depending on the particular chain being utilized of approximately 35 degrees. The cutting edge, as previously mentioned, of alternate teeth face in opposed directions.

After the saw has been used for a period of time, the cutting edge 20 of the teeth becomes dull requiring that such be sharpened by use of either a hand-held file or it can be sharpened mechanically in a shop. When a hand held file such as file 22 is utilized for sharpening the cutting edge of the teeth, it is important that the file be moved back and forth across the surface of the teeth at the precise desired angle of the tooth. When out in the field, it is difficult for an inexperienced operator to file the teeth to the precise desired angle.

A guide generally designated by the reference character 24 is provided for aiding in sharpening teeth carried on the chain of the chain saw. The guide disclosed in FIGS. 1, 2 and 3 includes a magnet 26 which has a flat inner surface that magnetically connects to the guide bar 14 by its flush inner wall. A wooden semicircular block 28 is attached to the outer surface of the magnet 26 and has a pair of bores 30 and 32 extending outwardly therefrom. These bores extend from the wooden block 28 at an angle corresponding to the desired sharpened angle on the cutting edge 20 of the teeth. Two bores 30 and 32 are incorporated in the block 28 so that a rod 34 when inserted therein can be positioned at different angles. For example, when the rod 34 is positioned in the bore 30, the rod will extend from the block at an angle of approximately 55 degrees which is the desired angle for the cutting surface of the tooth 18. If it is desired to sharpen the tooth at a different angle, then the rod 34 would be inserted in the bore 32. The end of the rod may be threaded for securely positioning it in one of the bores 30 or 32, or it could be merely a pressure fit therebetween.

When sharpening the leading edge of the tooth as illustrated in FIG. 2, as the file 22 is moved back and forth across the edge of the tooth, the operator keeps the file in alignment with the rod 34. As can be seen, the file 22 rides directly over and in alignment with the rod 34. As each tooth is sharpened, the chain is merely moved down the guide bar 14 the spacing of two teeth so that the next tooth facing in that direction can be sharpened. After all the teeth facing one side are sharpened, the magnetic member 24 is removed from the side bar and positioned on the other side of the guide bar for sharpening the teeth facing in the opposite direction.

In FIG. 4, there is illustrated a modified form of the invention. The guide includes a rectangular shaped magnet 36 which has a bracket 38 extending outwardly therefrom. Positioned on the bracket 38 are markings 40 indicating degrees. A rod 42 is secured to the bracket 38 by means of a bolt 44 and a wing nut 46. As a result, the angle that the rod 42 extends away from the bracket and magnet 36 can be varied by loosening the wing nut 46 and adjusting the rod to the desired angle. The guide is attached to the guide bar 14 in the same manner as the guide shown in FIG. 1.

In FIG. 5, instead of using a magnet for attaching the guide to the guide bar 14, a suction cup 48 is utilized. A rod 50 extends into a bore provided on a protrusion 52 extending out of the suction cup. The angle that the rod 50 extends out of the suction cup corresponds to the desired angle that the teeth on the chain saw should be sharpened.

While a preferred embodiment of the invention has been described using specific terms, such description is for illustrative purposes only, and it is to be understood that changes and variations may be made without departing from the spirit or scope of the following claims.

What is claimed is:

1. A guide for aiding in sharpening the teeth on a chain saw with a file, a cutting edge carried on said teeth, an elongated metal guide bar provided on said saw upon which said chain runs, said cutting edge of said teeth being at an acute angle to said elongated guide bar, said guide bar having opposed flat vertically extending side walls, said guide comprising:
   a magnet having a flat surface for magnetically being attached to said side wall of said metal guide bar;
   an elongated rod carried by said magnet extending horizontally from said magnet away from said wall of said guide bar;
   said rod extending away from said flat surface of said magnet at an acute angle corresponding to the angle of said cutting edge on said teeth of said chain;
   whereby when sharpening the teeth of said chain said file is maintained above and in alignment with said rod during each sharpening stroke of said file.

2. The guide for aiding in sharpening the teeth carried on a chain of a chain saw as set forth in claim 1 further comprising:
   a plurality of bores extending into said magnet at different angles into which said rod can be selectively positioned at different angles.

3. The guide as set forth in claim 1 further comprising:
   a bracket carried by said magnet;
   means for adjustably attaching said rod to said bracket so that the angle that said rod extends away from said guide bar can be varied.

4. A guide for aiding in sharpening the teeth carried on a chain of a chain saw with a file, a cutting edge carried on said teeth, an elongated guide bar provided on said saw upon which said chain runs, said cutting edge of said teeth being at an acute angle to said elongated guide bar, said guide bar having opposed flat vertically extending side walls, said guide comprising:
   attachment means for attachment to a side wall of said guide bar,
   an elongated rod carried by said attachment means extending horizontally from said attachment means away from said wall of said guide bar;
   said rod extending away from said guide bar at an acute angle corresponding to the angle of said cutting edge on said teeth of said chain;
   whereby when sharpening the teeth of said chain, said file is maintained above and in alignment with said rod during each sharpening stroke of said file.

5. The guide as set forth in claim 4 further comprising said attachment means includes a suction cup.

* * * * *